United States Patent [19]

Meffert

[11] Patent Number: 5,078,663
[45] Date of Patent: Jan. 7, 1992

[54] MOTOR VEHICLE AUTOMATIC TRANSMISSION

[75] Inventor: Peter Meffert, Tiefenbronn, Fed. Rep. of Germany

[73] Assignee: Dr. Ing. h.c.F. Porsche AG, Fed. Rep. of Germany

[21] Appl. No.: 583,322

[22] Filed: Sep. 17, 1990

[30] Foreign Application Priority Data

Sep. 16, 1989 [DE] Fed. Rep. of Germany ....... 3931025

[51] Int. Cl.⁵ ............................................. F16H 57/10
[52] U.S. Cl. .................................... 475/284; 475/289; 475/330
[58] Field of Search ............... 475/284, 285, 288, 289, 475/292, 297, 330

[56] References Cited

U.S. PATENT DOCUMENTS

| | | | |
|---|---|---|---|
| 3,811,343 | 5/1974 | Mori et al. | 475/285 |
| 3,835,732 | 9/1974 | Mori et al. | 475/285 X |
| 4,007,648 | 2/1977 | Brookout | 475/285 |
| 4,304,153 | 12/1981 | Moroto et al. | 74/759 |
| 4,653,348 | 3/1987 | Hiraiwa | 475/285 X |
| 4,660,439 | 4/1987 | Hiraiwa | 475/285 X |
| 4,711,138 | 12/1987 | Miura et al. | 74/761 |
| 4,939,955 | 7/1990 | Sugano | 475/285 X |

FOREIGN PATENT DOCUMENTS

| | | | |
|---|---|---|---|
| 0075271 | 9/1982 | European Pat. Off. | |
| 2053321 | 5/1972 | Fed. Rep. of Germany | 475/284 |
| 2612020 | 11/1976 | Fed. Rep. of Germany | |
| 52-52067 | 4/1977 | Japan | 475/285 |

*Primary Examiner*—Allan D. Herrmann
*Assistant Examiner*—William O. Trousdell
*Attorney, Agent, or Firm*—Evenson, Wands, Edwards, Lenahan & McKeown

[57] ABSTRACT

A shifting arrangement of an overdrive position of a fourth gear is connected behind a shifting arrangement of a Simpson gear set of a first gear and/or a second gear. The connection transforms a conventional four-speed automatic transmission into a five-speed automatic transmission or a six-speed automatic transmission.

25 Claims, 4 Drawing Sheets

MOTOR VEHICLE AUTOMATIC TRANSMISSION

BACKGROUND AND SUMMARY OF THE INVENTION

The present invention relates to a motor vehicle automatic transmission and, more particularly, to an improved automatic transmission having a hydrodynamic converter, clutches and brakes and having a Simpson gear set as a three-speed part and another planet gear set, a brake and a clutch which, together, form a fourth gear.

A transmission of this type is known from *ATZ Automobiltechnische Zeitschrift* 85 (1983)6, Page 393–398. The four-speed automatic transmission comprises a three-speed part, and the proven SIMPSON-brand gear set to which another planet gear set for the fourth speed was added which has a disk brake, a clutch and a one-way clutch.

The SIMPSON-brand gear set is a composite planetary transmission which comprises two simple planetary gears with a negative stationary gear ratio which are also called minus transmissions. In this case, one planetary transmission comprises a sun gear, a planet carrier having planetary wheels and a ring gear. Both minus transmissions are connected with one another by two coupling shafts. The first coupling shaft connects the sun gear of one planetary transmission with the sun gear of the second planetary transmission. The second coupling shaft connects the ring gear of the first planetary transmission with the planet carrier of the second planetary transmission. With the forward gears, the flux of force takes place from the outside to the ring gear of the second planetary transmission. The second coupling shaft serves as the output. The first speed of the SIMPSON-brand gear set is generated by the locking of the first planet carrier; the second speed is generated by the locking of the first coupling shaft. In the third speed, the flux of force acts simultaneously on the sun gear and the ring gear of the second planetary transmission, so that the Simpson gear set rotates as a block.

It is an object of the present invention to make the aforementioned type of transmission a five-speed or a six-speed transmission without any significant increase of the constructional expenditures and of the dimensions.

The foregoing object has been achieved by following the shifting arrangement of the SIMPSON-brand gear of the first and/or of the second gear with the shifting arrangement of the additional planet gear set used for an additional gear. Since the SIMPSON-brand shifting arrangement of a low gear speed is followed by the shifting arrangement of the additional planetary gear set used for another speed (for example, for the fourth speed) and thus a multiplication is achieved of the translational steps, an additional gear speed can be implemented without the requirement of having to constructionally change the entire transmission. Only corresponding clutches and/or brakes must be controlled for the shifting of the additional gear speed.

BRIEF DESCRIPTION OF THE DRAWINGS

These and other features, objects and advantages of the present invention will become more apparent from the following detailed description of presently preferred embodiments when taken in conjunction with the accompanying drawings wherein.

DETAILED DESCRIPTION OF THE DRAWINGS

Figure 1:
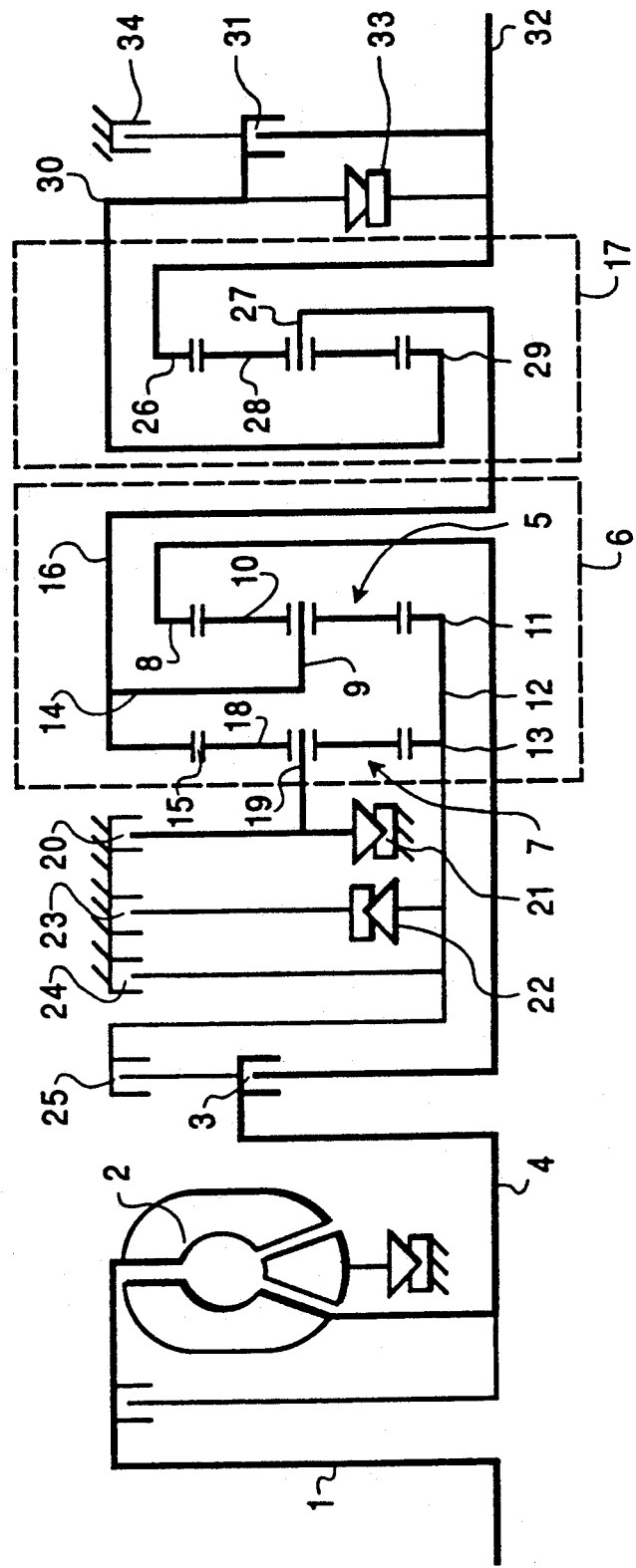
FIG. 1 is a schematic representation of an automatic transmission.

In the drawings, thick lines indicate actually shifted power fluxes, and thin lines indicate possible power flux connections.

Referring now to the automatic transmission shown in FIG. 1, a shaft 1 originating from the vehicle engine, by way of a hydrodynamic converter 2, drives a drive shaft 4 leading to a clutch 3. When the clutch 3 is closed, the power flux moves to a second planetary transmission 5 of a Simpson gear set 6. The second planetary transmission 5, like the first planetary gear 7 disposed in parallel to it, comprises a ring gear 8, a planet carrier 9 having planetary wheels 10 disposed on it and a sun gear 11. The ring gear 8 is driven by the clutch 3. The sun gear 11 is connected with the sun gear 13 of the first planetary transmission 7 via the coupling shaft 12. Another coupling shaft 14 connects the planet carrier 9 with the output shaft 16 coming from the ring gear 15 of the first planetary transmission 7 and leading to a planetary gear set 17 which, in the case of a conventional automatic transmission, serves as a 4-speed overdrive position. In the first planetary transmission 7, planetary wheels 18 mate with the ring gear 15, which planetary wheels 18 simultaneously mate with the sun gear 13 and are disposed on a planet carrier 19. A brake 20 fixed at the housing and, in addition, a one-way clutch 21 which locks the planet carrier 19 in one rotating direction, operatively act upon the planet carrier 19.

As shown by the thin lines, a one-way clutch 22 which acts by way of a brake 23 fixed at the housing and an additional brake 24 are mounted on the coupling shaft 12. In addition, the coupling shaft 12, by way of a shiftable clutch 25, can be connected with the drive shaft 4.

The planetary gear set 17 comprises a ring gear 26, a planet carrier 27 having planetary wheels 28 disposed thereat, and a sun gear 29. The output shaft 16 of the SIMPSON-brand gear set 6 is connected with the planet carrier 27. The sun gear 29, via an intermediate shaft 30, is connected which a shiftable clutch 31 as a result of which the power flux can be shifted to a transmission output shaft 32. The transmission output shaft 32, is also connected with the ring gear 26. In addition, a one-way clutch 33 can be disposed between the transmission output shaft 32 and the intermediate shaft 30. The intermediate shaft 30 can be locked by a brake 34 fixed at the housing transmission.

Figure 2:
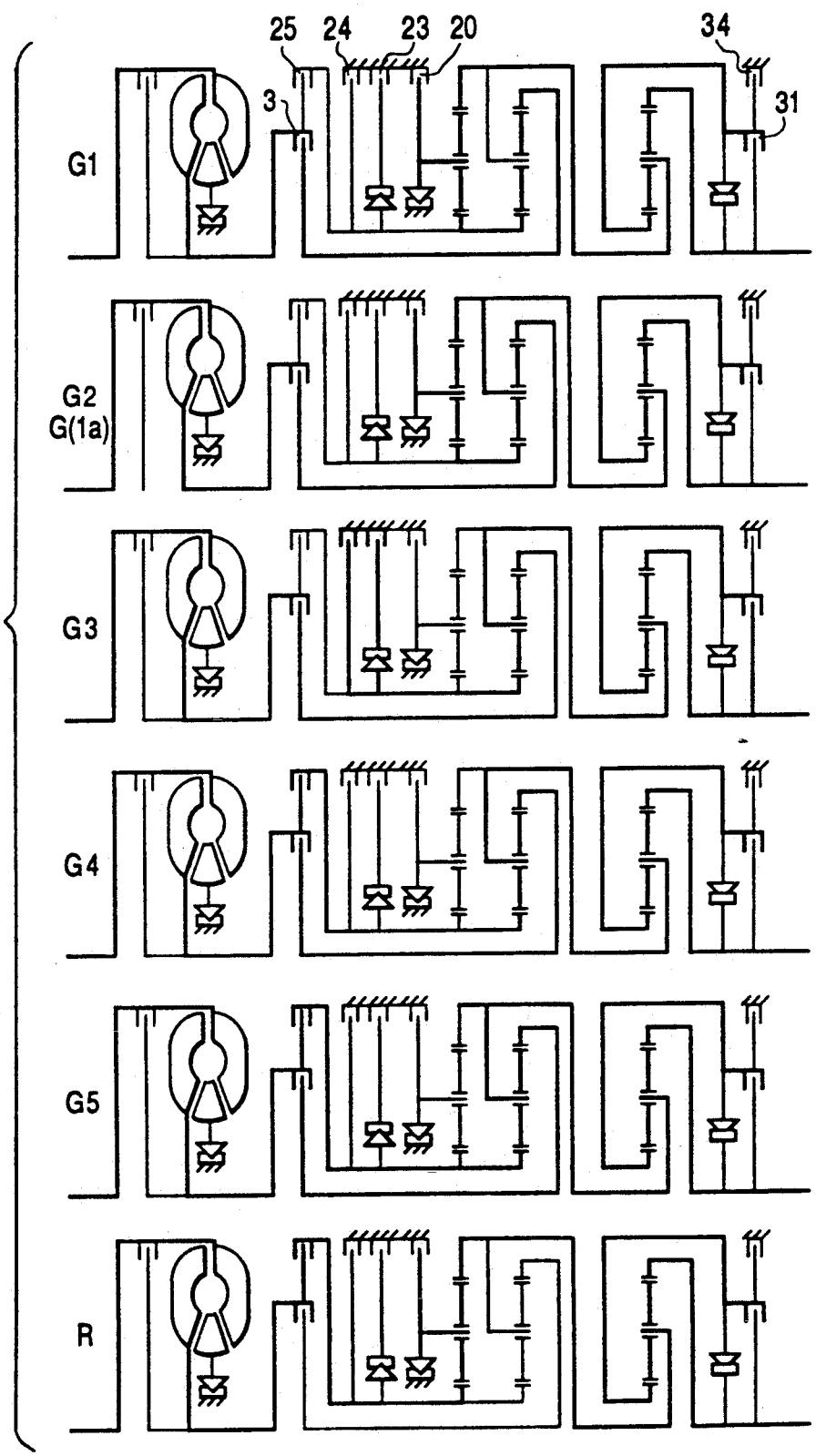
FIG. 2 a schematic representation of a five-speed automatic transmission in accordance with the present invention showing power flux connections in six gears.

When the clutches and brakes of the five-speed transmission shown in FIG. 2 are actuated as indicated in the following Table 1, all five gear speeds G1 to G5 and the reverse gear R can be shifted.

TABLE 1

| Brake/Clutch | 1st Gear | 2nd Gear (1a) | 3rd Gear | 4th Gear | 5th Gear | R-Gear |
|---|---|---|---|---|---|---|
| 3 | X | X | X | X | X | |
| 25 | | | | X | X | X |
| 23, 24 | | | X | | | |
| 20 | X | X | | | | X |
| 31 | X | | X | X | | X |
| 34 | | X | | | X | |

"X" means brake or clutch actuated.

Figure 3:
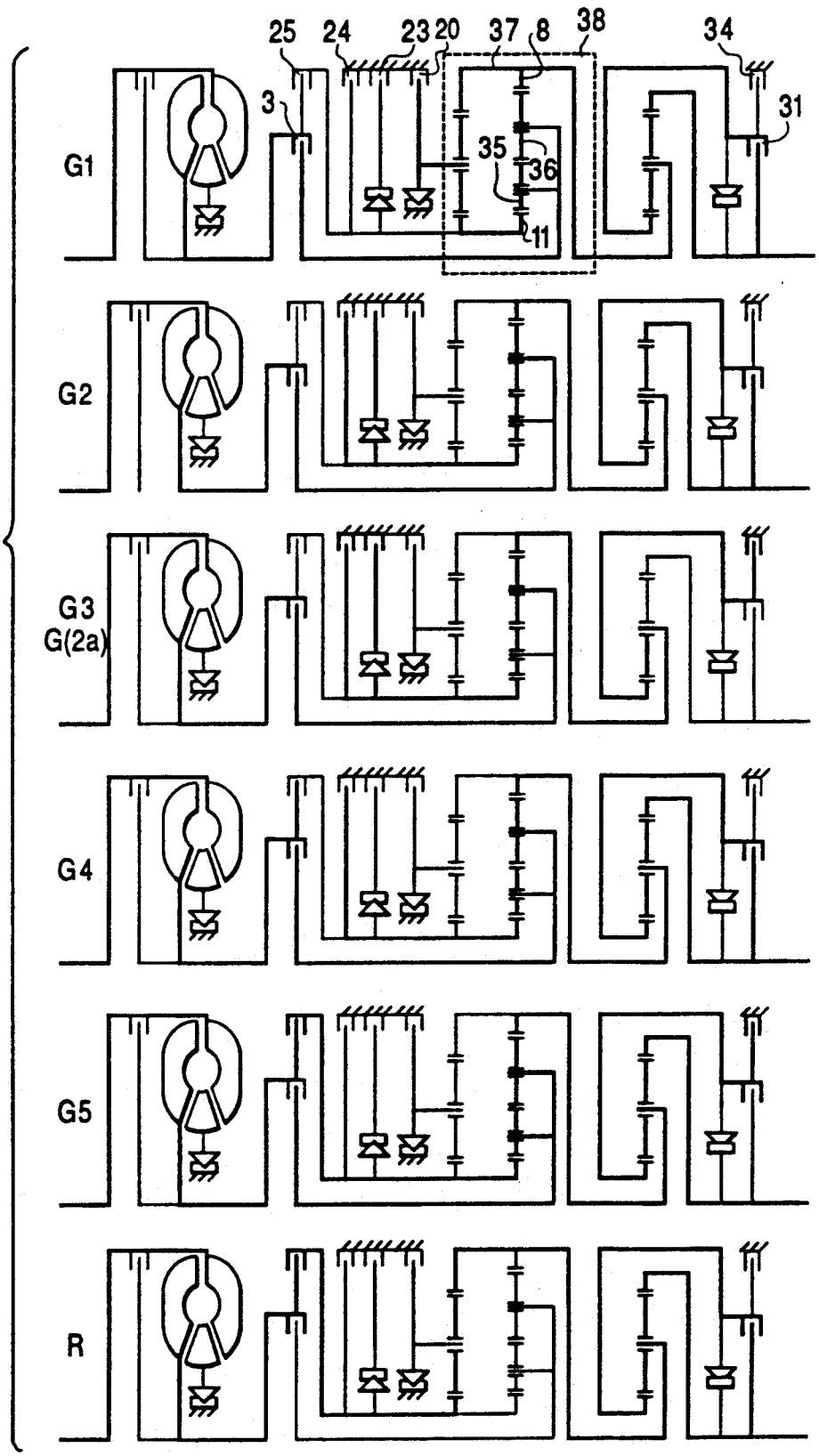
FIG. 3 is a schematic representation of a modified five-speed automatic transmission in accordance with the present invention showing power flux connections in six gears.

Another variant of the five-speed transmission shown in FIG. 3 is actuated as indicated in the following Table 2.

TABLE 2

| Brake/Clutch | 1st Gear | 2nd Gear | 3rd Gear (2a) | 4th Gear | 5th Gear | R-Gear |
|---|---|---|---|---|---|---|
| 3 | X | X | X | X | X | |
| 25 | | | | X | X | X |
| 23, 24 | | X | X | | | |
| 20 | X | | | | | X |
| 31 | X | X | | X | | X |
| 34 | | | X | | X | |

X means brake or clutch actuated.

In order to avoid high relative rotational planet speeds and small planet gear diameters, in a preferred construction of the invention, stepped planetary wheels instead of individual planetary wheels are used and are disposed coaxially with respect to one another.

Figure 4:
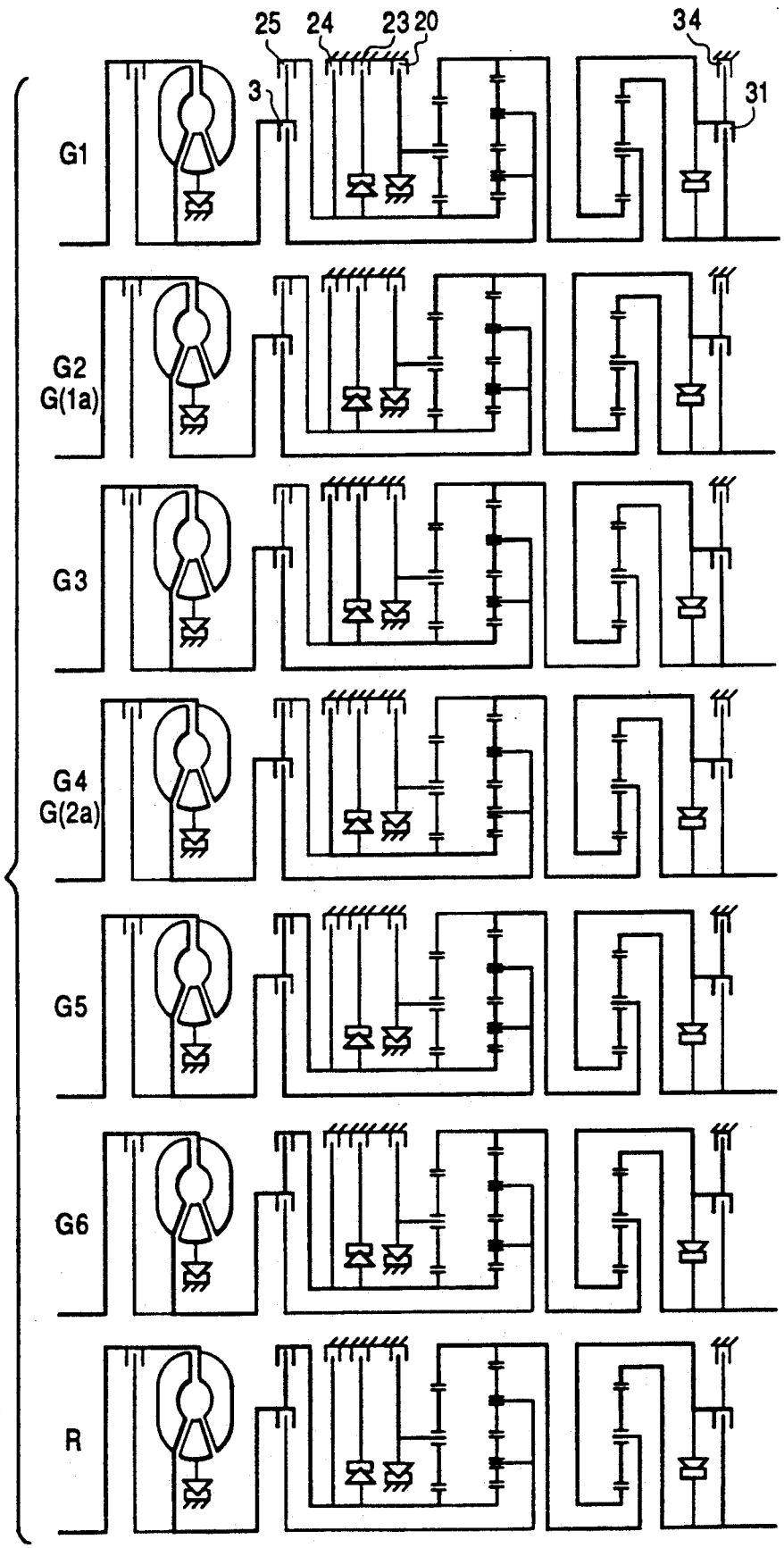
FIG. 4 is a schematic representation of a six-speed automatic transmission in accordance with the present invention showing power flux connections in seven gears.

A six-speed transmission with six forward speeds G1 to G6 and one reverse gear R shown in FIG. 4 can be implemented according to the following Table 3.

TABLE 3

| Brk./Clutch | 1st Gear | 2nd Gear (1a) | 3rd Gear | 4th Gear (2a) | 5th Gear | 6th Gear | R-Gear |
|---|---|---|---|---|---|---|---|
| 3 | X | X | X | X | X | X | |
| 25 | | | | | X | X | X |
| 23, 24 | | | X | X | | | |
| 20 | X | X | | | | | X |
| 31 | X | | X | | X | | X |
| 34 | | X | | X | | X | |

X means brake or clutch actuated.

The following Table 4 indicates advantageous transmission ratios in connection with a transmission constructing in accordance with the principles of the present invention.

TABLE 4

| Gear | Shifting Diagram of 5-Speed Automatic Transmission | Ratio Ranges |
|---|---|---|
| G1 | 1st gear from the three-speed planet gear set; the additional planet gear set rotates as a block | 3.30–2.70 |
| G2 (1a) | 1st gear from the three-speed planet gear set with ratio from the additional planet gear set | 2.60–1.90 |
| G3 | 2nd gear from the three-speed planet gear set; the additional planet gear set rotates as a block | 1.70–1.35 |
| G4 | 3rd gear from the three-speed planet gear set; the additional planet gear set rotates as a block | 1.00 |
| G5 | 3rd gear from the three-speed planet gear set with ratio from the additional planet gear set | 0.80–0.70 |

The foregoing are illustrative of selecting transmission ratios such that a useful transmission gradation is obtained which is advantageous for the particular vehicle in which a five or six speed transmission is used.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An automatic transmission for a motor vehicle comprising a hydrodynamic converter, a SIMPSON-brand gear set as a three-speed part and operatively associated with the converter, and an additional planet gear set, a brake and a clutch which, together, form a fourth gear, wherein a shifting arrangement of the SIMPSON-brand gear set of at least one of a first gear and of a second gear are followed by a shifting arrangement of the additional planet gear set used for an additional gear, wherein the shifting arrangement of the SIMPSON-brand gear set of the first gear is followed by the shifting arrangement of the fourth gear acting as an overdrive position, and another transmission gear is place between the first gear and the second gear of the SIMPSON-brand gear set so as to provide a five-speed transmission.

2. The automatic transmission according to claim 1, wherein a shifting arrangement of an overdrive position of the fourth gear is used as the shifting arrangement for the additional gear.

3. The automatic transmission according claim 1, wherein the transmission is configured such that selected transmission ratios provide a useful transmission gradation for the vehicle.

4. The automatic transmission according to claim 3, wherein a shifting arrangement of an overdrive position of the fourth gear is used as the shifting arrangement for the additional gear.

5. The automatic transmission according to claim 1, wherein the shifting arrangement of the Simpson gear set of the first gear is followed by the shifting arrangement of the fourth gear acting as an overdrive position, and another transmission gear is placed between the first gear and the second gear of the Simpson gear set so as to provide a five-speed transmission.

6. The automatic transmission according to claim 5, wherein a shifting arrangement of an overdrive position of the fourth gear is used as the shifting arrangement for the additional gear.

7. The automatic transmission according to claim 6, wherein transmission ratios are selected such that a useful transmission gradation is obtained which is advatageous for the respective vehicle.

8. The automatic transmission according to claim 1, wherein a second planetary transmission of the Simpson gear set includes larger and smaller planetary wheels, with the smaller planetary wheel mating with a sun gear and the larger planetary wheel mating with a ring gear.

9. The automatic transmission according to claim 8, wherein a shifting arrangement of an overdrive position of the fourth gear is used as the shifting arrangement for the additional gear.

10. The automatic transmission according to claim 9, wherein transmission ratios are selected such that a useful transmission gradation is obtained which is advantageous for the respective vehicle.

11. The automatic transmission according to claim 8, wherein the shifting arrangement of the Simpson gear set of the first gear is followed by the shifting arrangement of the fourth gear acting as an overdrive position, and another transmission gear is placed between the first gear and the second gear of the Simpson gear set so as to provide a five-speed transmission.

12. The automatic transmission according to claim 8, wherein the shifting arrangement of the Simpson gear set of the second gear is followed by the shifting arrangement of the fourth gear acting as an overdrive position, and an additional transmission gear is placed between the second and the third gear of the Simpson gear set so as to provide a five-speed transmission.

13. The automatic transmission according to claim 8, wherein the shifting arrangement of the Simpson gear set of one of the first gear and of the second gear is followed by the shifting arrangement of the fourth gear acting as the overdrive position, selectively by actuation of clutches and brakes associated therewith, and an additional transmission gear, respectively is placed between the first gear and the second gear as well as between the second gear and the third gear of the Simpson gear set to provide a six-speed transmission.

14. The automatic transmission according to one of claim 1, wherein the Simpson gear set comprises a first planetary transmission and a second planetary transmission which includes two mutually mating planetary wheels at a planet carrier, one of the planetary wheels mating with a sun gear, and the other of the planetary wheels mating with a ring gear, the planet carrier being driven from outside, and the ring gears of the two planetary transmissions being operatively connected by a coupling shaft which serves as the output from the Simpson gear set.

15. The automatic transmission according to claim 14, wherein a shifting arrangement of an overdrive position of the fourth gear is used as the shifting arrangement for the additional gear.

16. The automatic transmission according to claim 15, wherein transmission ratios are selected such that a useful transmission gradation is obtained which is advantageous for the respective vehicle.

17. An automatic transmission for a motor vehicle comprising a hydrodynamic converter, a SIMPSON-brand gear set as a three-speed part and operatively associated with the converter, and an additional planet gear set, a brake and a clutch which, together, form a fourth gear, wherein a shifting arrangement of the SIMPSON-brand gear set of at least one of a first gear and of a second gear are followed by a shifting arrangement of the additional planet gear set used for an additional gear, wherein the shifting arrangement of the SIMPSON-brand gear set of the second gear is followed by the shifting arrangement of the fourth gear acting as an overdrive position, and an additional transmission gear is placed between the second and the third gear of the SIMPSON-brand gear set so as to provide a five-speed transmission.

18. The automatic transmission according to claim 17, wherein a shifting arrangement of an overdrive position of the fourth gear is used as the shifting arrangement for the additional gear.

19. The automatic transmission according to claim 18, wherein the transmission is configured such that selected transmission ratios provide a useful transmission gradation for the vehicle.

20. An automatic transmission for a motor vehicle comprising a hydrodynamic converter, a SIMPSON-brand gear set as a three-speed part and operatively associated with the converter, and an additional planet gear set, a brake and a clutch which, together, form a fourth gear, wherein a shifting arrangement of the SIMPSON-brand gear set of at least one of a first gear and of a second gear are followed by a shifting arrangement of the additional planet gear set used for an additional gear, wherein the shifting arrangement of the SIMPSON-brand gear set of one of the first gear and of the second gear is followed by the shifting arrangement of the fourth gear acting as the overdrive position, selectively by actuation of clutches and brakes associated therewith, and an additional transmission gear, respectively is placed between the first gear and the second gear as well as between the second gear and the third gear of the SIMPSON-brand gear set to provide a six-speed transmission.

21. The automatic transmission according to claim 20, wherein a shifting arrangement of an overdrive position of the fourth gear is used as the shifting arrangement for the additional gear.

22. The automatic transmission according to claim 20, wherein the transmission is configured such that selected transmission ratios provide a useful transmission gradation for the vehicle.

23. An automatic transmission for a motor vehicle, comprising a hydrodynamic converter, a SIMPSON-brand gear set as a three-speed part and operatively associated with the converter, and an additional planet gear set, a brake and a clutch which, together, form a fourth gear, wherein a shifting arrangement of the SIMPSON-brand gear set of at least one of a first gear and of a second gear are followed by a shifting arrangement of the additional planet gear set used for an additional gear, the SIMPSON-brand gear set comprises a first planetary transmission and a second planetary transmission which includes two mutually mating planetary wheels at a planet carrier, one of the planetary wheels mating with a sun gear, and the other of the planetary wheels mating with a ring gear, the planet carrier being driven from outside, and the ring gears of the two planetary transmissions being operatively connected by a coupling shaft which serves as the output from the SIMPSON-brand gear set, wherein the shifting arrangement of the SIMPSON-brand gear set of the first gear is followed by the shifting arrangement of the fourth gear acting as an overdrive position, and another transmission gear is placed between the first gear and the second gear of the SIMPSON-brand gear set so as to provide a five-speed transmission.

24. An automatic transmission for a motor vehicle comprising a hydrodynamic converter associated with the converter, and an additional planet gear set, a brake and a clutch which, together, form a fourth gear, wherein a shifting arrangement of the SIMPSON-brand gear set of at least one of a first gear and of a second gear are followed by a shifting arrangement of the additional planet gear set used for an additional gear, the SIMPSON-brand gear set comprises a first planetary transmission and a second planetary transmission which includes two mutually mating planetary wheels at a planet carrier, one of the planetary wheels mating with a sun gear, and the other of the planetary wheels mating with a ring gear, the planet carrier being driven from outside, and the ring gears of the two planetary transmissions being operatively connected by a coupling shaft which serves as the output from the SIMPSON-brand gear set, wherein the shifting arrangement of the SIMPSON-brand gear set of the second gear is followed by the shifting arrangement of the fourth gear acting as an overdrive position, and an additional transmission gear is placed between the second and the third gear of the SIMPSON-brand gear set so as to provide a five-speed transmission.

25. An automatic transmission for a motor vehicle, comprising a hydro dynamic converter, a SIMPSON-brand gear set as a three-speed part and operatively associated with the converter, and an additional planet gear set, a brake and a clutch which, together, form a fourth gear, wherein a shifting arrangement of the SIMPSON-brand gear set of at least one of a first gear and of a second gear are followed by a shifting arrangement of the additional planet gear set used for an additional gear, the SIMPSON-brand gear set comprises a first planetary transmission and a second planetary transmission which includes two mutually mating planetary wheels at a planet carrier, one of the planetary wheels mating with a sun gear, and the other of the planetary wheels mating with a ring gear, the planet carrier being driven from outside, and the ring gears of the two planetary transmissions being operatively connected by a coupling shaft which serves as the output from the SIMPSON-brand gear set, wherein the shifting arrangement of the SIMPSON-brand gear set of one of the first gear and of the second gear is followed by the shifting arrangement of the fourth gear acting as the overdrive position, selectively by actuation of clutches and brakes associated therewith, and an additional transmission gear, respectively is placed between the first gear and the second gear as well as between the second gear and the third gear of the SIMPSON-brand gear set to provide a six-speed transmission.

* * * * *